United States Patent Office 3,692,720
Patented Sept. 19, 1972

3,692,720
RESINOUS COMPOSITIONS FROM HYDROXY-ALKYLATED ROSIN DERIVATIVES
Martin F. Sloan, Wilmington, Del., assignor to Hercules Incorporated, Wilmington, Del.
No Drawing. Continuation-in-part of application Ser. No. 765,655, Oct. 7, 1968. This application Jan. 25, 1971, Ser. No. 109,555
Int. Cl. C08l 11/04
U.S. Cl. 260—24                                   7 Claims

ABSTRACT OF THE DISCLOSURE

Novel resin compositions useful in manufacture of printing inks are prepared by reaction of hydroxalkylated rosin and hydroxyalkylated rosin adducts with an isocyanate.

---

This application is a continuation-in-part of application Ser. No. 765,655, filed Oct. 7, 1968, now abandoned.

This invention relates to resin compositions derived by reaction of an isocyanate and a hydroxyalkylated rosin or a hydroxyalkylated rosin adduct. The novel resin compositions of this invention have particular utility in the manufacture of hot melt adhesives, and in the manufacture of printing inks.

The term "rosin" as used herein includes natural rosin, refined or unrefined, such as natural wood rosin, natural gum rosin, and tall oil rosin; the pure rosin acids of which rosin is comprised, such as abietic acid and d-pimaric acid, alone or in admixture with one another; and mixtures of any two or more of the above. The term also includes modified rosin such as disproportionated rosin, partially or substantially completely hydrogenated rosin, and polymerized rosin.

As above set forth a hydroxyalkylated rosin adduct can be employed as a reactant in this invention. Rosin adducts are known in the art and are reaction products of rosin with an acidic compound containing the

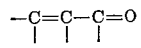

group. Methods of preparing these adducts are disclosed and described in Pats. 2,628,918 and 2,684,300. Examples of acidic compounds containing the

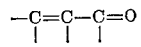

group that can be used to prepare the adducts include acrylic acid, maleic anhydride, fumaric acid, maleic acid, itaconic acid, citraconic acid, and citraconic anhydride.

Typical analysis of rosins that can be used in this invention are set forth in Table I below.

TABLE I

| | Hydrogenated rosin | Topped wood rosin | Tall oil rosin | Polymerized rosin | Rosin maleic anhydride adduct |
|---|---|---|---|---|---|
| Acid number | 166 | 166 | 173.5 | 134 | 220 |
| DEG saponification number | 172 | 174 | 178.0 | 148 | 290 |
| Drop softening point, °C.[1] | 76 | 90 | 80 | 152 | |
| Percent unsaponifiables | 8.1 | 4.8 | 3.8 | 8.0 | |
| Color [2] | XC | | WW | N | |
| Percent abietic acid | | 40 | 38 | | 9 |

[1] Hercules drop method.
[2] USDA—rosin scale.

Hydroxyalkylated rosin is prepared by heat reaction of rosin with an epoxide such as ethylene oxide, and hydroxyalkylated rosin adduct is prepared by heat reaction of a rosin adduct such, for example, as rosin-maleic anhydride adduct with an epoxide such as propoylene oxide. The epoxide. employed reacts with the acidic group(s) of rosin and rosin adducts to form the respective hydroxyalkylated rosin and hydroxyalkylated rosin adduct. As will be apparent to those skilled in the art the product of the epoxide reaction can be mono- or polyhydroxyalkylated; and the reaction mass will often be comprised of both mono- and polyhydroxyalkylated products. As will also be apparent to those skilled in the art, the particular composition of the reaction mass will be determined in large measure by the nature of the initial reactants, the relative proportions of the initial reactants, and conditions under which reaction is carried out. Methods for the preparation of hydroxyalkylated rosin and hydroxyalkylated rosin adduct are illustrated in the examples set forth hereinafter. A temperature within the range of from about 140° C. to about 240° C. is suitable for carrying out the reaction with epoxide. Reaction is preferably carried out under a pressure sufficient to maintain the reactants in a liquid state at reaction temperature. The mole ratio of rosin to epoxide employed can vary from about 1/1 to about 1/5. Reaction will usually proceed more rapidly at the higher temperatures.

Epoxides that can be employed in preparation of hydroxyalkylated rosin and hydroxyalkylated rosin adducts include ethylene oxide, propylene oxide, glycidol, and the like. Mixtures of two or more epoxides can be used if desired.

The resin compositions of this invention will usually be mixtures of monomeric reaction products and polymeric reaction products. These resin compositions are prepared by reacting the hydroxyalkylated rosin, hydroxyalkylated rosin adduct and mixtures thereof and an isocyanate, for a period of time sufficient to provide reaction between reactive hydroxyl group(s) of the hydroxyalkylated rosin or hydroxyalkylated rosin adduct and the isocyanate group(s) of the particular isocyanate employed.

Isocyanates which can be employed in preparation of the resinous compositions of this invention include alkyl isocyanates such as methyl isocyanate and ethyl isocyanate; alkane diisocyanates such as ethylene diisocyanate; trimethylene diisocyanate and hexamethylene diisocyanate; the alkene diisocyanates such as 1-propylene-1,2-diisocyanate and 1-butylene-1,3-diisocyanate; the alkylidene diisocyanates such as ethylidene diisocyanate and propylidene-1,1-diisocyanate; the aromatic isocyanates and diisocyanates such as phenyl isocyanate; m-phenylene diisocyanate; p-phenylene diisocyanate; 2,4-tolylene diisocyanate; 2,6-tolylene diisocyanate; methylene bis(4-phenyl isocyanate) and other isocyanates such as polymethylene polyphenyl isocyanate having an average NCO functionality of about three and the isocyanate prepared by reaction of tolylene diisocyanate and trimethylol propane at an NCO/OH mole ratio of about 2/1. Mixtures of two or more isocyanates can be employed if desired.

The following examples will more fully illustrate this invention. All parts and percentages are by weight unless otherwise specified. Example 1 illustrates the preparation of hydroxyalkylated rosin from tall oil rosin and ethylene oxide.

EXAMPLE 1

A pressure type reaction vessel is charged with 1200 parts of tall oil rosin having an acid number of 173.5 and a saponification number of 178. The tall oil rosin is heated to a temperature of from 180–197° C. and agitated. About 515 parts of ethylene oxide is slowly added to the tall oil rosin over a period of 13 hours. The pressure in the reaction vessel is maintained at between 180 p.s.i.g. and 200 p.s.i.g. by the slow addition of ethylene oxide. Following completion of the addition of ethylene oxide to the pressure vessel, the resulting reaction mixture is maintained at a temperature of 180° C. for two hours. The reaction mixture is then cooled to 150° C. Nitrogen, at 150 p.s.i.g., is flushed through the reaction mixture to remove dissolved unreacted ethylene oxide. The resulting product is further stripped of residual ethylene oxide by subjecting the reaction mixture to a vacuum of about 1.0 mm. mercury at 80° C. About 1509 parts of a viscous hydroxyalkylated rosin is recovered having an acid number of 0.3, a saponification number of 138, a hydroxyl content of 4.4%, and an ethylene oxide to carboxyl group ratio of 1.7/1.0.

The following example illustrates preparation of the resins of this invention by reaction of the hydroxyalkylated rosin prepared in Example 1 with a diisocyanate.

EXAMPLE 2

A stirred reaction vessel in blanketed with nitrogen. About 200 parts of the hydroxyethylated rosin prepared in Example 1 is heated to 150° C. and charged to the reaction vessel. To the heated hydroxyethylated rosin is added 66.3 parts of methylene bis(4-phenylisocyanate) over a period of 26 minutes. The temperature of the admixture is raised to 200° C. over a period of three hours and it is maintained at this temperature for 45 minutes. The resulting resinous composition has a drop softening point of 96° C. and contains 0.06% isocyanate groups and 0.5% hydroxyl groups.

The following example illustrates the preparation of a resinous composition from the hydroxyethylated rosin of Example 1, and a mixture of diisocyanates.

EXAMPLE 3

Two hundred (200) parts of the hydroxyethylated rosin prepared in Example 1 is heated to 150° C. and charged to a stirred reaction vessel which has been blanketed with nitrogen. To the hydroxyethylated rosin is added 45.1 parts of a mixture of diisocyanates comprised of 80% of 2,4-tolylene diisocyanate and 20% of 2,6-tolylene diisocyanate. During the addition period of about twenty-five minutes the temperature of the mixture is raised from 150° C. to 170° C. Following the addition of the diisocyanates the temperature of the reaction mixture is raised to 190° C. and maintained at that temperature for 2.5 hours. The resulting resinous composition has a drop softening point of 86° C. and contains 0.8% hydroxyl groups. No unreacted isocyanate groups are detected.

The following example illustrates preparation of a hydroxyethylated rosin prepared from polymerized rosin and ethylene oxide.

EXAMPLE 4

To a stirred pressure vessel is charged 1200 parts of polymerized rosin having an acid number of 134, and saponification number of 148. The polymerized rosin is heated to a temperature of 178–185° C. and 380 parts of ethylene oxide is slowly added to the rosin over a 7-hour period thereby maintaining the pressure within the pressure vessel at between 180 p.s.i.g. and 200 p.s.i.g. The remainder of the processing procedure is substantially as set forth in Example 1. There is recovered 1367 parts of a solid hydroxyethylated polymerized rosin having a drop softening of 80° C., an acid number of 1.3, and a saponification number of 119. This hydroxyethylated rosin contains 3.5% hydroxyl groups, and has an ethylene oxide to carboxyl group ratio of 1.3/1.0.

The following example illustrates preparation of a resinous composition from the hydroxyethylated polymerized rosin of Example 4 with a diisocyanate.

EXAMPLE 5

About 200 parts of the hydroxyethylated polymerized rosin of Example 4 is heated to 150° C. and charged to a stirred reaction vessel which has been blanketed with nitrogen. Over a thirty-minute time period 52 parts of methylene bis(4-phenylisocyanate) is added to the hydroxyethylated rosin. During the addition period the temperature of the admixture is raised from 150° C. to about 180° C. Following the addition of the methylene bis(4-phenylisocyanate) the temperature of the reaction mixture is raised to 220° C. and held at that temperature for 3.3 hours. A resinous composition is recovered having a drop softening point of 150° C. and containing .02% isocyanate groups and 0.5% hydroxyl groups.

The following example illustrates preparation of a resinous composition from the hydroxyethylated rosin prepared in Example 4 and a mixture of diisocyanates.

EXAMPLE 6

About 200 parts of hydroxyethylated polymerized rosin is heated to 150° C. and is charged to a stirred reaction vessel which has been blanketed with nitrogen. Over a 45-minute time interval 35.4 parts of a mixture of diisocyanates comprised of 80% of 2,4-tolylene diisocyanate and 20% of 2,6-tolylene diisocyanate is added to the hydroxyethylated rosin. During this addition period the temperature of the admixture is raised from 150° C. to 190° C. Following the addition of the diisocyanates the temperature of the resulting admixture is raised to 210° C. and maintained at that temperature for three hours. A resinous composition is recovered having a drop softening point of 148° C. and containing 0.03% isocyanate groups, and 0.7% hydroxyl groups.

The following example illustrates the preparation of a rotogravure ink employing the resinous composition prepared in Example 6.

EXAMPLE 7

About 10 parts of carbon black pigment is dispersed directly into about 40 parts of the resinous composition of Example 6, by use of a two-roller rubber mill. The resulting pigmented resin chips are dissolved in 50 parts of toluene. The resulting solution is a highly satisfactory rotogravure ink.

The following example illustrates preparation of hydroxyalkylated rosin adduct prepared by reaction of the adduct of N-wood rosin and fumaric acid with ethylene oxide.

EXAMPLE 8

A three-necked reaction vessel is equipped with a motor-driven stirrer, a thermometer, a vertical condenser fitted with a T-tube for nitrogen entry, and a stopper on one neck. The stoppered neck is used as an addition port. About 820 parts of N-wood rosin is added to the reaction vessel, and the vessel flushed with nitrogen. The rosin is then heated, under a blanket of nitrogen, to a temperature of about 180° C. During the next 1½ hours, 180 parts of fumaric acid is added, with stirring, in small portions. During the final hour of addition of the fumaric acid, the reaction mass in the vessel is maintained at a temperature that varies from about 205° C. to 210° C. After addition of all fumaric acid, the reaction mass is maintained at a temperature between 205° and 210° C. for about 1½ hours. The reaction mass, removed from the reaction vessel, has an acid number of 288, a drop softening point of 150° C. and a content of about 0.13% by weight of free unadducted fumaric acid. About 350 parts of the reaction mass is placed in a high pressure autoclave and heated to about 180° C. About 310 parts of ethylene oxide is added to the autoclave under a pressure of about 200 p.s.i.g. The ethylene oxide is added slowly, in small increments, over a period of about 6 hours, during which time the temperature of the added ethylene oxide varied from about 180° C. to 190° C. The reaction mixture is maintained at about 190° C. under a pressure of about 200 p.s.i.g. for about 3 hours, cooled to room temperature and removed from the autoclave. Unreacted ethylene oxide is removed from the reaction mixture. The resulting hydroxyalkylated rosin adduct is a viscous but pourable mass. It has an acid number of 1.6, a saponification number of 209, and a hydroxyl content (by acetylation) of about 6%.

The following example illustrates preparation of a resinous composition from the hydroxyalkylated rosin adduct of Example 8.

EXAMPLE 9

About 100 parts of hydroxyalkylated rosin adduct prepared in Example 8 is charged to a reaction vessel and blanketed with nitrogen. The hydroxyalkylated rosin is heated to 150° C. To the heated hydroxyalkylated rosin adduct is added 42 parts of phenylisocyanate over a period of 20 minutes. The temperature of the admixture is heated to 200° C. over a period of three hours and the admixture is maintained at this temperature for 45 minutes. A hard resinous composition of this invention results.

In preparation of the resins of this invention it is generally preferred to employ mole ratios of hydroxyalkylated rosin to isocyanate so that the mole ratio of hydroxyl groups to isocyanate groups is about 1.0/1.0. However, an excess of either component can be employed if desired yielding resins containing terminal hydroxyl groups and terminal isocyanate groups. Mixtures of different hydroxyalkylated rosins and mixtures of isocyanates can be employed if desired.

The temperature employed in preparation of the resins will depend in part on the softening point of the hydroxyalkylated rosin or the hydroxyalkylated rosin adduct employed, as well as the softening point of the resulting resinous composition and its viscosity. In general, a temperature within the range of from about 50° C. to about 250° C. is suitable. A preferred range is from about 150° C. to about 200° C. The time required to achieve substantially complete reaction between hydroxyalkylated rosin or hydroxyalkylated rosin adduct and an isocyanate will vary with the source of rosin, degree of hydroxylation, i.e., whether the rosin or rosin adduct is mono- or polyhydroxylated rosin, and the temperature of the reaction. In general, reaction rates are slower at lower temperatures. When operating in the preferred temperature range reaction times will vary from about 1 hour to about 6 hours.

It is understood that the above examples and specification are illustrative of this invention and not in limitation thereof.

What I claim and desire to protect by Letters Patent is:

1. As a new composition of matter, a resinous reaction product of (a) a hydroxyalkylated material selected from the group consisting of hydroxyalkylated rosin adducts and mixtures of adducts, said hydroxyalkylated material prepared by reaction of rosin adducts prepared by reaction of rosin consisting essentially of resin acids with an acidic compound containing the group

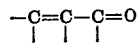

with an epoxide selected from the group consisting of ethylene oxide, propylene oxide, glycidol, and mixtures thereof, at a temperature of from about 140° C. to about 240° C. the mole ratio of rosin to epoxide being from about 1:1 to about 1:5, and (b) an organic isocyanate, said reaction of hydoxyalkylated material and organic isocyanate taking place at a temperature of from about 50° C. to about 250° C., the mole ratio of hydroxy groups on the hydroxyalkylated material to isocyanate groups being about 1:1.

2. The resinous reaction product of claim 1 wherein material (a) is hydroxylated rosin adduct prepared by reaction of the adduct of rosin and maleic anhydride with ethylene oxide.

3. The resinous reaction product of claim 1 wherein material (a) is hydroxylated rosin adduct prepared by reaction of the adduct of rosin and fumaric acid with etheylene oxide.

4. The resinous reaction product of claim 1 wherein material (a) is hydroxylated rosin adduct prepared by reaction of the adduct of rosin and acrylic acid with ethylene oxide.

5. The resinous reaction product of claim 1 wherein the isocyanate (b) is comprised of a mixture of 2,4-tolylene diisocyanate and 2,6-tolylene diisocyanate.

6. The resinous reaction product of claim 1 wherein the isocyanate (b) is comprised of polymethylene polyphenyl isocyanate.

7. The method of preparing a resinous reaction product comprising (1) admixing a hydroxyalkylated material (a) selected from the group consisting of hydroxyalkylated rosin adducts and mixtures thereof, said hydroxyalkylated material (a) prepared by reaction of rosin adducts prepared by reaction of rosin consisting essentially of resin acids with an acidic compound containing the group

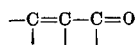

with an epoxide selected from the group consisting of ethylene oxide, propylene oxide, glycidol, and mixtures thereof with (b) an organic isocyanate wherein the mole ratio of hydroxyl groups of (a) to isocyanate groups of (b) is about 1:1, (2) heating the resulting admixture at a temperature of from about 50° C. to about 250° C. for a time sufficient to provide reaction between the hydroxyl groups of (a) with the isocyanate groups of (b), and (3) recovering the resulting resinous reaction product.

References Cited
UNITED STATES PATENTS 3,248,348    4/1966    Piechota et al. _____ 260—2.5
3,252,924    5/1966    Merten et al. _____ 260—2.5

DONALD E. CZAJA, Primary Examiner

D. J. BARRACK, Assistant Examiner

U.S. Cl. X.R.

260—78.4 R, 78.4 EP, 97.5, 101, 103

PO-1050
(5/69)

UNITED STATES PATENT OFFICE
CERTIFICATE OF CORRECTION

Patent No. 3,692,720      Dated September 19, 1972

Inventor(s) Sloan (Case 3-5)

It is certified that error appears in the above-identified patent and that said Letters Patent are hereby corrected as shown below:

Column 6, line 2 of Claims 2 and 3 of printed patent; "hydroxylated" should read
--hydroxyalkylated--

Signed and sealed this 15th day of May 1973.

(SEAL)
Attest:

EDWARD M. FLETCHER, JR.
Attesting Officer

ROBERT GOTTSCHALK
Commissioner of Patents